United States Patent
Ikeda et al.

(10) Patent No.: US 7,918,561 B2
(45) Date of Patent: Apr. 5, 2011

(54) PROJECTION DISPLAY DEVICE IN WHICH POSITION OF THE LIGHT SOURCE IS SHIFTED TOWARD PROJECTION OPTICAL SYSTEM SIDE

(75) Inventors: Takashi Ikeda, Higashi-Osaka (JP); Shinya Matsumoto, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 494 days.

(21) Appl. No.: 12/041,712

(22) Filed: Mar. 4, 2008

(65) Prior Publication Data
US 2008/0309885 A1    Dec. 18, 2008

(30) Foreign Application Priority Data
Mar. 5, 2007  (JP) ................... 2007-054107

(51) Int. Cl.
G03B 21/00 (2006.01)
G03B 21/26 (2006.01)
G03B 21/14 (2006.01)
G03B 21/28 (2006.01)
G02F 1/00 (2006.01)
G02B 6/00 (2006.01)
G02B 23/24 (2006.01)

(52) U.S. Cl. ............... 353/31; 353/57; 353/33; 353/81; 353/79; 353/37; 353/99; 348/751; 348/790; 385/133; 359/434

(58) Field of Classification Search ............ 353/31, 353/57, 33, 81, 79, 37, 99; 348/751, 790; 385/133; 359/434
See application file for complete search history.

(56) References Cited

U.S. PATENT DOCUMENTS
7,066,610 B2 * 6/2006 Yamada et al. ......... 353/119
2005/0162617 A1 * 7/2005 Koo ......................... 353/46

FOREIGN PATENT DOCUMENTS
JP       2004-258620 A1   9/2004

* cited by examiner

Primary Examiner — Georgia Y Epps
Assistant Examiner — Magda Cruz
(74) Attorney, Agent, or Firm — Marvin A. Motsenbocker; Mots Law, PLLC

(57) ABSTRACT

An optical system (light guiding optical system) for guiding G-light and R-light to liquid crystal panels is protruded in an opposite direction from projection optical system with regard to an optical axis of a light source. A space is created between an optical engine and a wall surface, and air stream for suction fan is thus secured. A distance (H1) between the optical engine and the wall surface can be reduced to, for example, a thickness of an external housing of the projector. Since a unit comprising the light source and a suction fan is retracted in a direction of the projection optical system than a protruded portion of the light guiding optical system, a distance (H2) from an end edge of the optical engine to a projection light emitting position can be reduced.

9 Claims, 10 Drawing Sheets

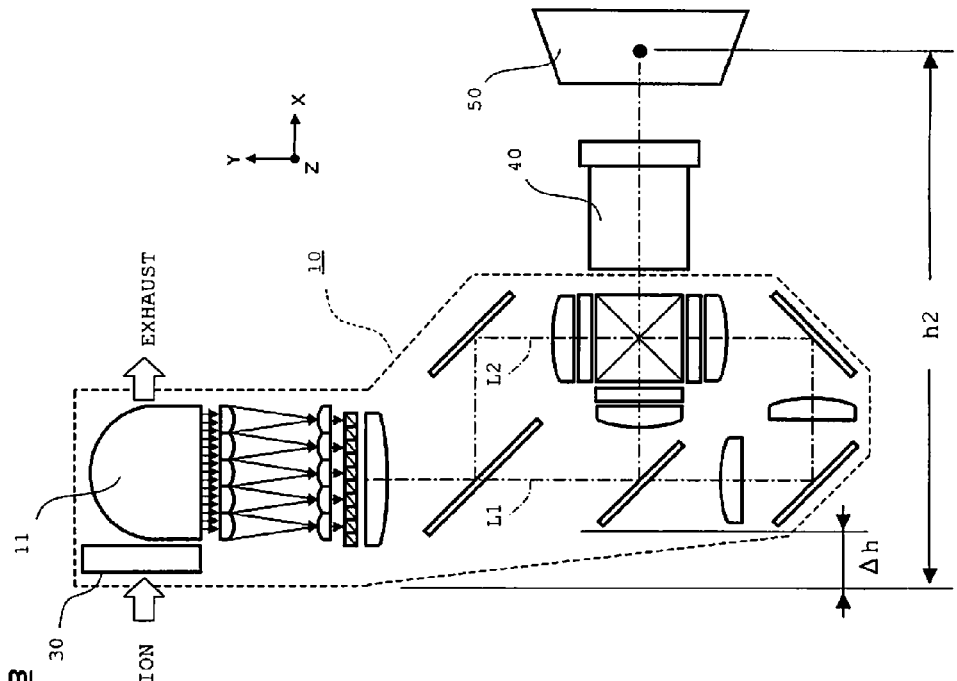
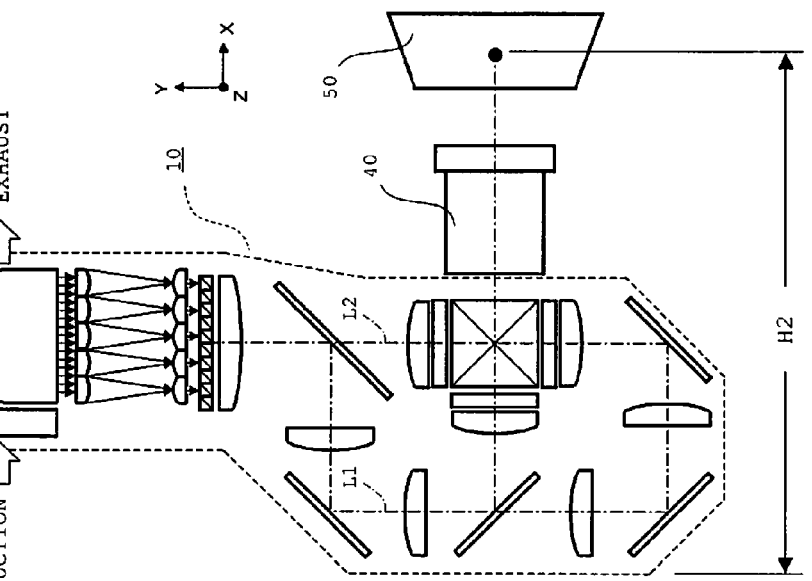

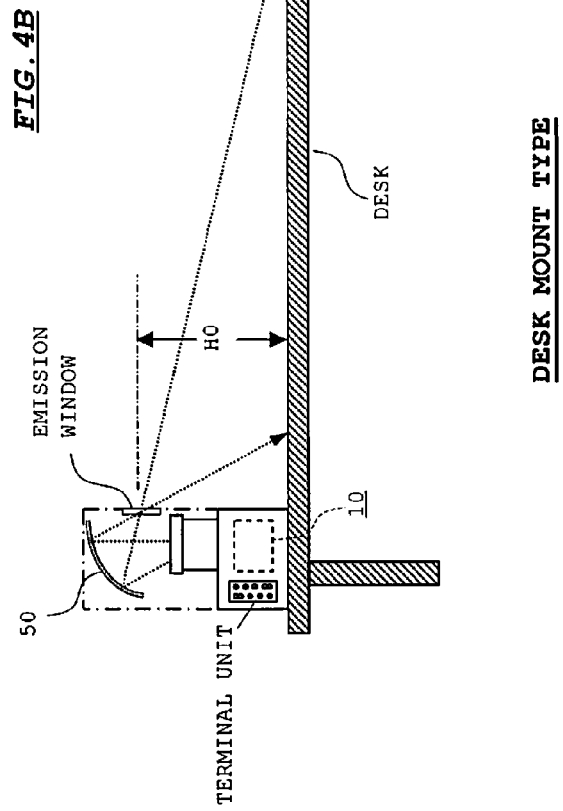
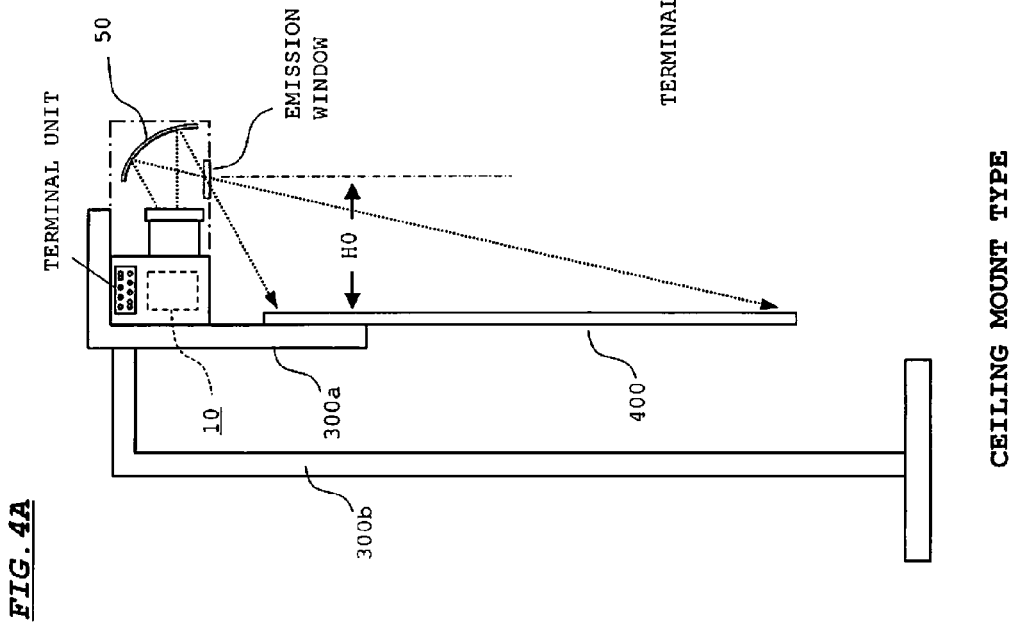
FIG. 4A
CEILING MOUNT TYPE
FIG. 4B
DESK MOUNT TYPE

PROJECTION DISPLAY DEVICE IN WHICH POSITION OF THE LIGHT SOURCE IS SHIFTED TOWARD PROJECTION OPTICAL SYSTEM SIDE

This application claims priority under 35 U.S.C. Section 119 of Japanese Patent Application No. 2007-054107 filed Mar. 5, 2007, entitled "PROJECTION DISPLAY DEVICE".

BACKGROUND OF THE INVENTION

1. Field of the Invention

The present invention relates to a projection display device for projecting an image on an imager on a screen or the like, and in particular, is preferably used for a type of a projection display device in which a projection light enters a projected plane from a direction oblique to the projected plane at a wider spread angle by reflecting the projection light by a mirror.

2. Description of the Related Art

Conventional projection display devices (hereafter, referred to as "projectors") have such an arrangement that, as shown in, for example, FIG. 7, projection light from an optical engine is projected on a screen by a projection optical system. In this case, widening of a distance between the projector and the screen allows displaying of a large-sized image on the screen. On the other hand, people and things are not allowed to stand in a space between the projector and the screen, thereby causing a problem that the space is wasted.

The problem may be resolved by, for example, reducing a throw distance of the projector. However, for the reduced throw distance, a diameter of a projection lens needs to be increased and a focal distance needs to be decreased (a curvature of the projection lens is increased), and another problem such as the projection lens becomes gigantic will be caused.

On the other hand, a spread angle of a projection light can be widened by reflecting the projection light from the projection optical system by an aspherical mirror. According to this method, the projection light enters from a direction oblique to the screen plane as shown in FIGS. 8A and 8B, and therefore, a space needed to secure traveling of the projection light is restricted. Further, widening of the spread angle of the projection light (hereafter, this is referred to as a "wider angle" of the projection light) is achieved by the aspherical mirror, and therefore, the wider angle can be obtained by a comparatively smaller aspherical mirror without using the gigantic projection lens as mentioned above. Accordingly, increase in size and cost in the projectors can be suppressed.

FIG. 9 illustrates an example of an arrangement of an optical system in a case where a projection light from a projection optical system is reflected by an aspherical mirror.

In FIG. 9, reference number 10 denotes an optical engine, reference number 40 denotes a projection optical system, and reference number 50 denotes an aspherical mirror. The optical engine 10 includes an optical system from a light source 11 to a dichroic prism 28, and a suction fan 30 for cooling the light source 11. The dashed line in the figure shows an outline of the optical engine 10.

The light source 11 comprises a lamp and a reflector, and emits approximately parallel light to a fly-eye integrator 12. The fly-eye integrator 12 comprises first and second integrators having groups of lenses, the lenses being arranged like a fly-eye, and gives a lens function to the light emitted from the light source 11 so that uniformity of light distribution is obtained when the light emit to liquid crystal panels 18, 21 and 27. In other words, the light transmitted through each lens of the groups of the lenses disposed like the fly-eye are respectively entered to the liquid crystal panels 18, 21 and 27 with a spread corresponding to an aspect ratio of the liquid crystal panels.

A PBS (polarized beam splitter) array 13 has a plurality of PBSs and ½ wavelength plates arranged like an array, and arranges a direction of polarization of the light entered from the fly-eye integrator 12 in one direction. A condenser lens 14 converges the light entered from the PBS array 13.

A dichroic mirror 15 reflects, for example, only light in a blue wavelength band (hereafter, referred to as "B-light"), among the light entered from the condenser lens 14, while light in a red wavelength band (hereafter, referred to as "R-light") and light in a green wavelength band (hereafter, referred to as "G-light") are transmitted. A mirror 16 reflects the B-light reflected by the dichroic mirror 15 to enter the B-light to a condenser lens 17. The condenser lens 17 gives a lens function to the B-light so that the B-light is entered to the liquid crystal panel 18 in a state of approximately parallel light. The liquid crystal panel 18 is driven in response to an image signal for a blue color and modulates the B-light in response to a driven state of the liquid crystal panel 18. The B-light transmitted through the condenser lens 17 is entered to the liquid crystal panel 18 via a polarizer (not shown).

A dichroic mirror 19 reflects, for example, only the G-light of the R-light and G-light transmitted through the dichroic mirror 15. A condenser lens 20 gives a lens function to the G-light so that the G-light is entered to the liquid crystal panel 21 in a state of approximately parallel light. The liquid crystal panel 21 is driven in response to an image signal for a green color and modulates the G-light in response to a driven state of the liquid crystal panel 21. The G-light transmitted through the condenser lens 20 is entered to the liquid crystal panel 21 via a polarizer (not shown).

Relay lenses 22 and 24 give a lens function to the R-light so that an incident state of the R-light with regard to the liquid crystal panel 27 becomes identical with incident states of the B-light and G-light with regard to the liquid crystal panels 18 and 21. Mirrors 23 and 25 change a light path of the R-light so that the R-light transmitted through the dichroic mirror 19 is guided to the liquid crystal panel 27. A condenser lens 26 gives a lens function to the R-light so that the R-light is entered to the liquid crystal panel 27 in a state of approximately parallel light. The liquid crystal panel 27 is driven in response to an image signal for a red color and modulates the R-light in response to a driven state of the liquid crystal panel 27. The R-light transmitted through the condenser lens 26 is entered to the liquid crystal panel 27 via a polarizer (not shown).

A dichroic prism 28 synthesizes the B-light, G-light, and R-light being modulated by the liquid crystal panels 18, 21 and 27, and enters the synthesized light to the projection optical system 40. The projection optical system 40 includes a group of lenses for image formation of the projection light on the projected plane. The aspherical mirror 50 widens the projection light entered from the projection optical system 40 and projects it on the projected plane.

With an arrangement in which the projection light from the projection optical system is reflected by the aspherical mirror, as shown in FIGS. 8A and 8B, the shorter a distance (h0) from the screen to a projection light emitting position is, the smaller the space for the projection light traveling is, and then, a possibility that the projection light is blocked by obstacles or the like is reduced. With the arrangement shown in FIG. 8A being used, when a person explains referring to images projected on the screen, the shorter the distance h0 is, the closer the person can stand to the screen, thereby presenting his/her explanations in a smooth manner. Similarly, when the arrangement shown in FIG. 8B is used, the shorter the distance (h0), the lower the possibility that the projection light is blocked by people around a desk or things placed on the desk, thereby providing higher operability or usability for user.

In this way, the projector of this type reflects light from the projection optical system 40 by the aspherical mirror 50 and projects the light on the screen, therefore, reduction in size in a direction of an optical axis in the projection optical system 40 poses a problem.

However, in the example of the arrangement shown in FIG. 9, since the suction fan 30 is disposed on a side of a wall surface of a holding mechanism, desk, or the like as shown in FIG. 10, it is necessary to provide a distance (h1) between the optical engine 10 and the wall surface to secure suction by the suction fan 30, resulting in a problem such as increase in the distance (h0) by the distance (h1) accordingly. Furthermore, in the example of the arrangement shown in FIG. 9, since a portion including the light source 11 and the suction fan 30 protrudes to the wall surface side, a distance (h2) from the optical engine 10 to the projection light emitting position becomes longer as shown in FIG. 10, and there arises such a problem that the distance (h0) is increased accordingly.

SUMMARY OF THE INVENTION

A projection display device according to a main aspect of the present invention comprises a light source, a cooling unit for cooling the light source, imagers individually disposed corresponding to light in at least three wavelength bands, a light guiding optical system for guiding the light in the respective wavelength bands, among light from the light source, to the corresponding imagers, a photosynthesis element for synthesizing the light in the respective wavelength bands modulated by the imagers, and a projection optical system for projecting the light synthesized by the photosynthesis element, wherein an optical axis of the light source and an optical axis of the projection optical system approximately orthogonally intersects, and at the same time, the light guiding optical system protrudes in an opposite direction from the position of the projection optical system with regard to the optical axis of the light source.

According to the arrangement relating to this aspect, since the light guiding optical system protrudes from the position of the projection optical system in the opposite direction with regard to the optical axis of the light source, a space is created between the light source and a wall surface, and air stream for the cooling unit is secured via the space. Therefore, as shown in FIG. 2 (embodiment), it is possible to suppress a distance (H1) between an optical engine and the wall surface, thereby reducing a distance (H0) from a screen to a projection light emitting position.

Furthermore, according to the arrangement relating to this aspect, it is possible to retract a position of the light source and cooling unit from a protruded portion of the light guiding optical system in a direction of the projection optical system. It is therefore possible to suppress a distance (H2) shown in FIG. 2 (embodiment) as compared to a distance (h2) in an arrangement shown in FIG. 10, and a distance (H0) from the wall surface (screen, or the like) to the projection light emitting position can be reduced by a retracted length. Reduction of the distance (H2) shown in FIG. 2 (embodiment) as compared to the distance (h2) in the arrangement shown in FIG. 10 will be explained in the following embodiment with reference to FIG. 3.

BRIEF DESCRIPTION OF THE DRAWINGS

The above-mentioned objects and other objects, and novel features of the present invention will be more fully understood upon consideration of description of embodiments shown below referring to the following accompanying drawings.

FIGS. 3A and 3B illustrate advantages of the projector according to the embodiment;

FIGS. 4A and 4B illustrate states when the projector according to the embodiment is used;

However, the drawings are used exclusively for explanation and should not be construed as limiting the scope of the present invention.

DESCRIPTION OF THE PREFERRED EMBODIMENTS

Below, preferred embodiments of the present invention will be described with reference to the drawings.

Figure 1:
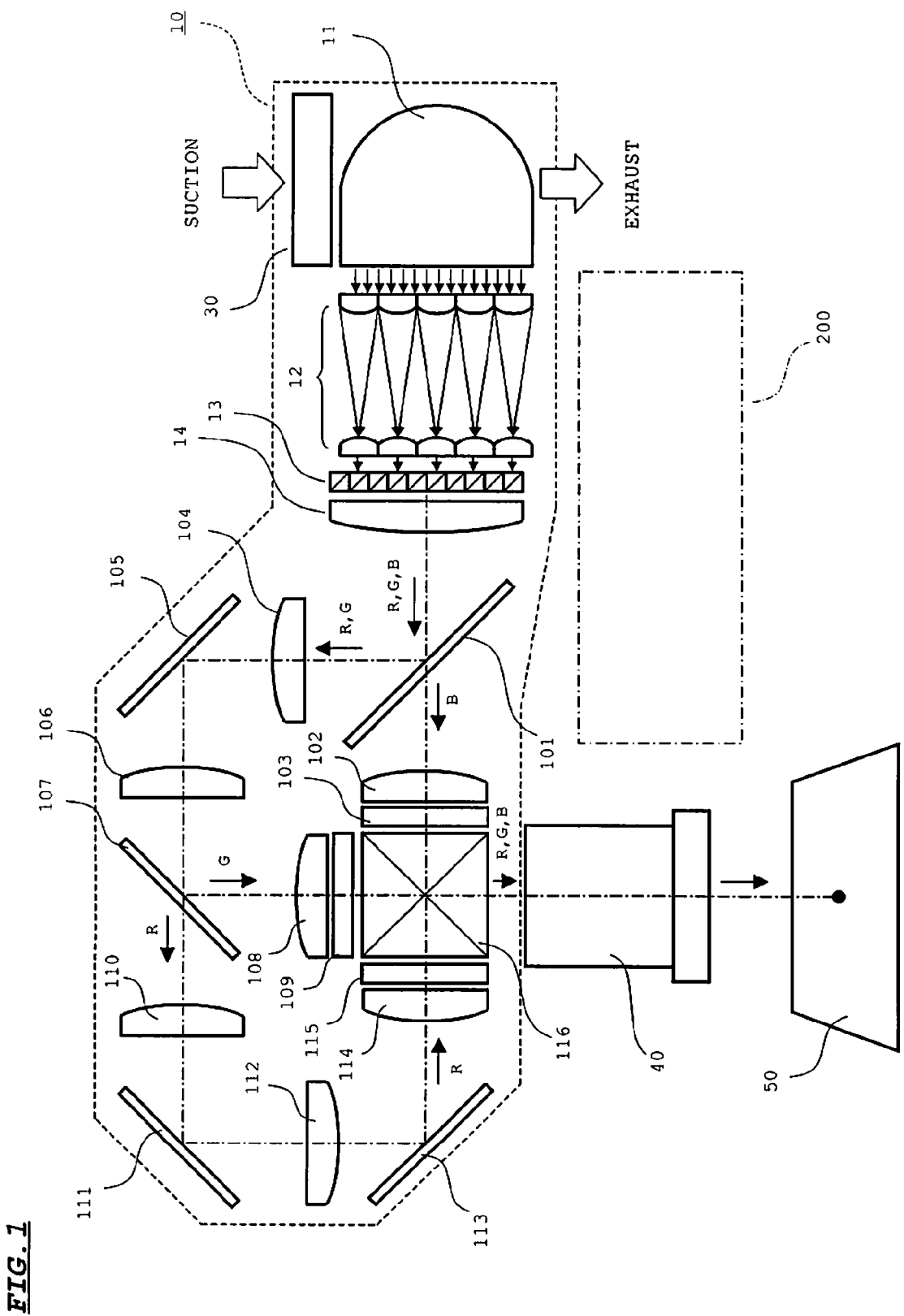
FIG. 1 illustrates an arrangement of a projector according to an embodiment of the present invention.
Figure 9:
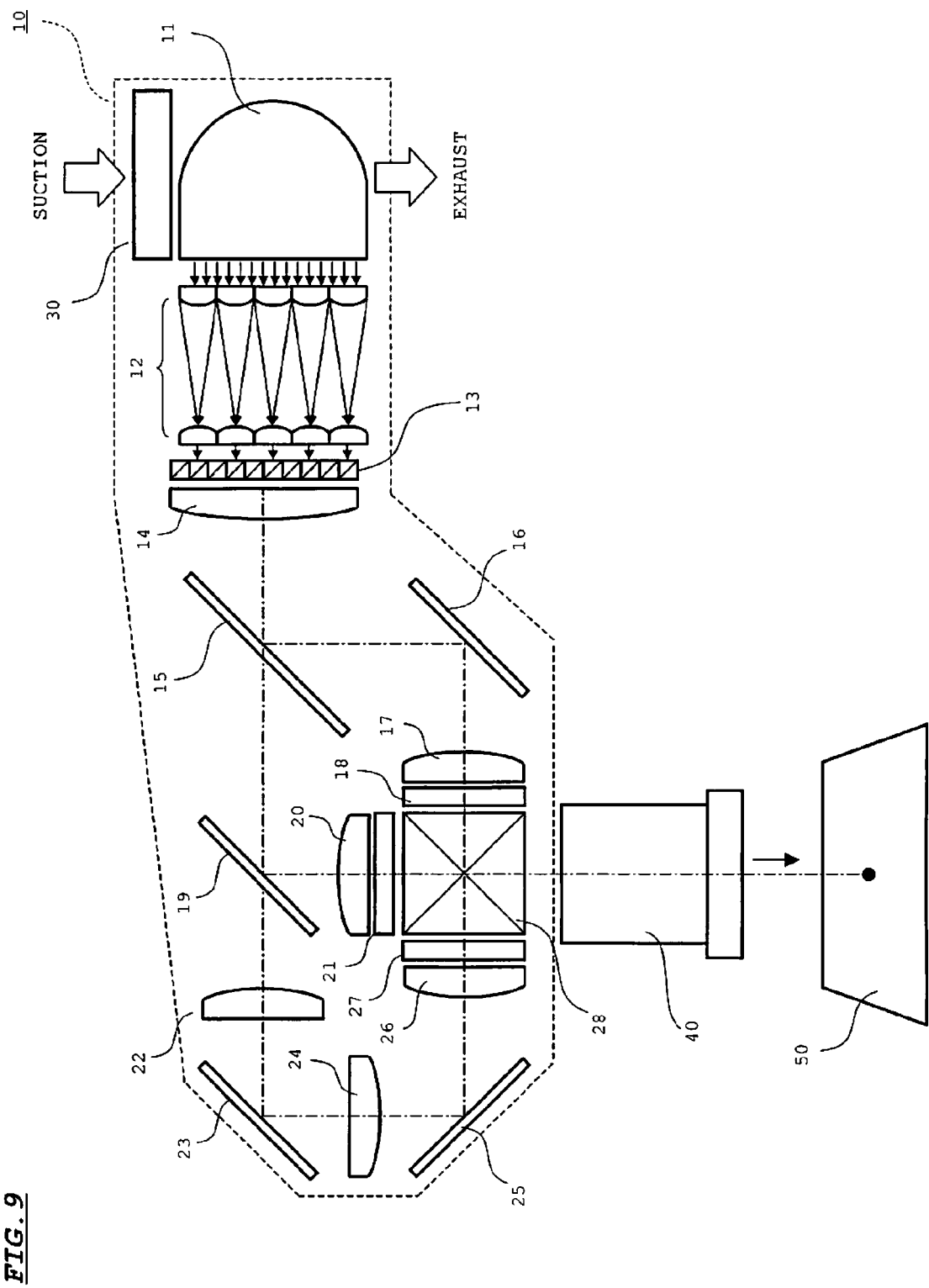
FIG. 9 illustrates an example of an arrangement of the projector that projects the projection light at the wider angle by the aspherical mirror.

FIG. 1 shows arrangement of the projector according to the embodiment. In the optical unit 10 in the embodiment, an optical system behind a condenser lens 14 differs from the example of arrangement shown in FIG. 9. In the figure, same reference numbers are put to arrangements identical with those in FIG. 9, and explanation thereof will be omitted.

A dichroic mirror 101 transmits only B-light of light entered from the condenser lens 14 and reflects R-light and G-light. A condenser lens 102 gives a lens function to the B-light so that the B-light is entered to a liquid crystal panel 103 in a state of parallel light. The liquid crystal panel 103 is driven in response to an image signal for a blue color and modulates the B-light in response to a driven state of the liquid crystal panel 103. The B-light transmitted through the condenser lens 102 is entered to the liquid crystal panel 103 via a polarizer (not shown).

Relay lenses 104 and 106 give a lens function to the R-light and G-light reflected by the dichroic mirror 101 so that an incident state of the G-light with regard to a liquid crystal panel 109 becomes identical with an incident state of the B-light with regard to the liquid crystal panel 103. A mirror 105 changes optical paths of the R-light and G-light transmitted through the relay lens 104 by 90 degrees.

A dichroic mirror 107 reflects only G-light of the R-light and G-light transmitted through the relay lens 106. A condenser lens 108 gives a lens function to the G-light so that the G-light is entered to the liquid crystal panel 109 in a state of parallel light. The liquid crystal panel 109 is driven in response to an image signal for a green color and modulates the G-light in response to a driven state of the liquid crystal panel 109. The G-light transmitted through the condenser lens 108 is entered to the liquid crystal panel 109 via a polarizer (not shown).

Relay lenses 110 and 112 give a lens function to the R-light so that an incident state of the R-light with regard to a liquid crystal panel 115 becomes identical with the incident states of the B-light and the G-light with regard to the liquid crystal panels 103 and 109. Each of mirrors 111 and 113 changes an optical path of the R-light by 90 degrees so that the R-light transmitted through the dichroic mirror 107 is guided to the liquid crystal panel 115. A condenser lens 114 gives a lens function to the R-light so that the R-light is entered to the liquid crystal panel 115 in a state of parallel light. The liquid crystal panel 115 is driven in response to an image signal for a red color and modulates the R-light in response to a driven state of the liquid crystal panel 115. The R-light transmitted through the condenser lens 114 is entered to the liquid crystal panel 115 via a polarizer (not shown).

A dichroic prism 116 synthesizes the B-light, G-light and R-light modulated by the liquid crystal panels 103, 109, and 115, and the synthesized light enters the projection optical system 40.

Reference number 200 is an electric circuit system for actuating the projector. As shown in FIG. 1, the electric circuit system 200 is disposed in a space between a light source 11 and the projection optical system 40. Terminals relating to the electric circuit system 200 (a power supply and terminals for inputting image signals, etc.) are provided at a side surface among side surfaces of an external housing of the projector excluding the side surface facing to the wall surface shown in FIG. 2.

Figure 2:
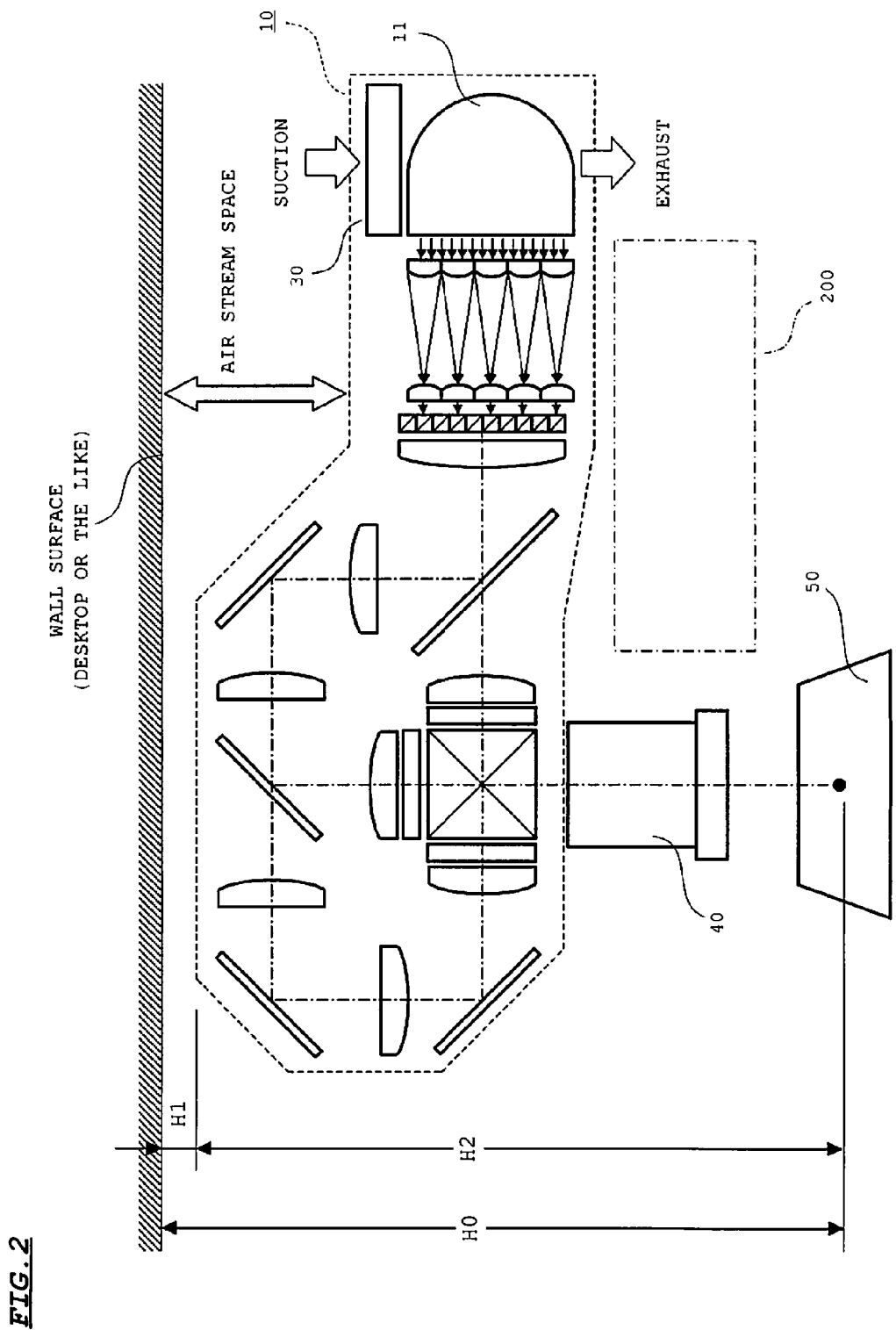
FIG. 2 illustrates advantages of the projector according to the embodiment.

FIG. 2 illustrates advantages of the present embodiment.

In the present embodiment, since the optical system (light guiding optical system) for guiding the G-light and R-light to the liquid crystal panels 109 and 115 protrudes in an opposite direction from a position of projection optical system 40 with regard to the optical axis of the light source 11a space (air stream space) is created between the optical engine 10 and the wall surface, and air stream for a suction fan 30 is secured via the space. Therefore, a distance (H1) between the optical engine 10 and the wall surface can be suppressed to approximately a thickness of the external housing of the projector, and a distance (H0) from the wall surface to a projection light emitting position can eventually be reduced.

Figure 10:
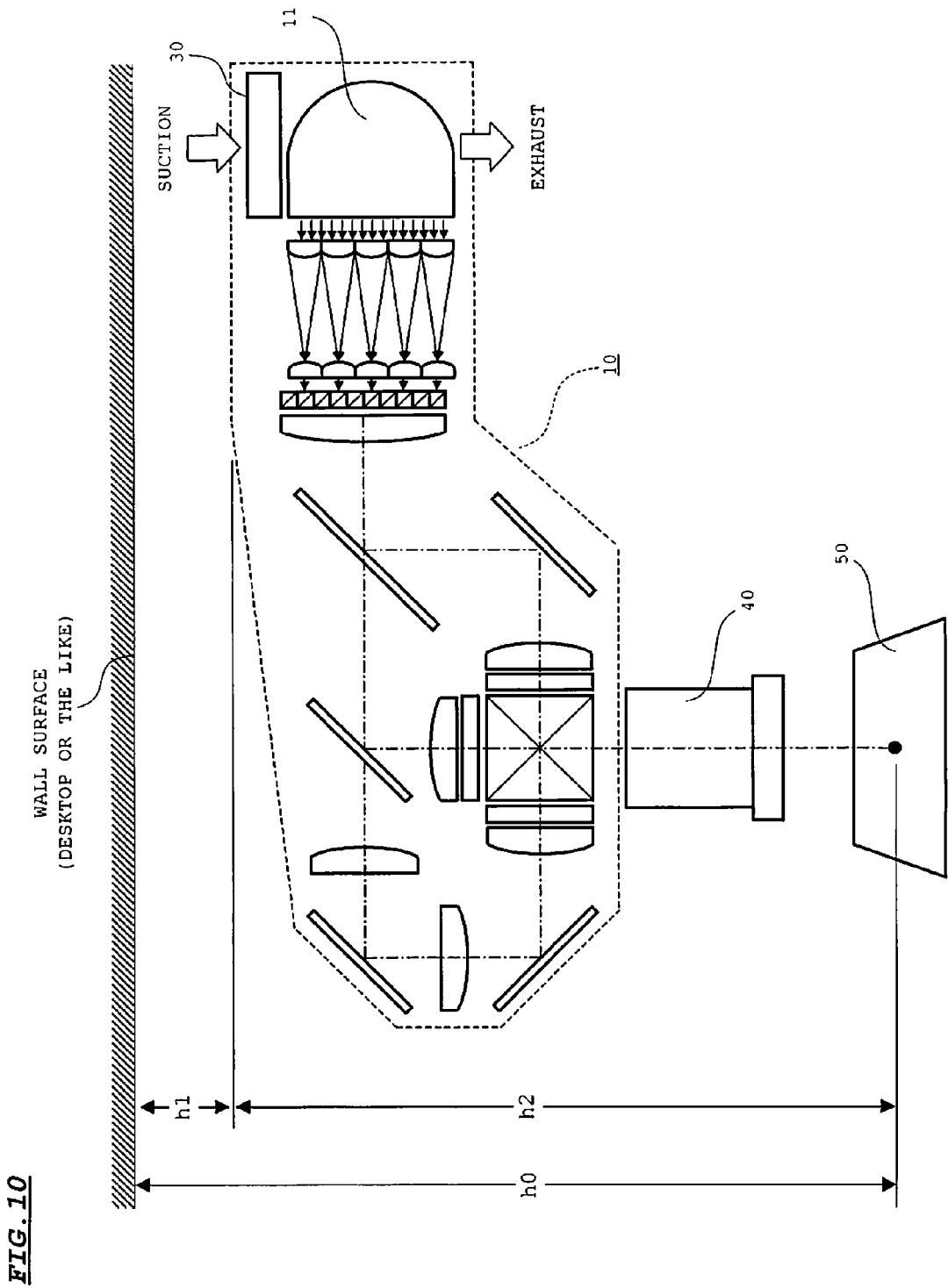
FIG. 10 illustrates problems of the example of the arrangement shown in FIG. 9.

In the present embodiment, since position of unit portion comprising the light source 11 and the suction fan 30 can be retracted in a direction of the projection optical system 40 from protrusion portion of the light guiding optical system, a distance (H2) from an end edge of the optical engine 10 to the projection light emitting position can be suppressed as compared to the distance (h2) in the example of the arrangement shown in FIG. 10, and the distance (H0) from the wall surface to the projection light emitting position can be reduced by the retracted length. In FIGS. 3A and 3B, the distance (H2) in the arrangement of the present embodiment and the distance (h2) in the example of the arrangement in FIG. 10 are shown, respectively.

Of members disposed in the optical engine 10, the unit comprising the light source 11 and the suction fan 30 has a greater dimension than other optical members in a direction of an X-axis in the figure. In the example of arrangement (comparative example) shown in FIG. 3B, the unit comprising the light source 11 and the suction fan 30 is disposed on an extended line of an optical path L1, the unit protrudes from optical members on the optical path L1 in the opposite direction of the projection optical system 40. Therefore, the distance (h2) in the example of arrangement (comparative example) shown in FIG. 3B is a distance, as illustrated, between an end edge of the suction fan 30 and the projection light emitting position.

On the other hand, in the present embodiment, as shown in FIG. 3A, the unit comprising the light source 11 and the suction fan 30 is disposed on an extended line of an optical path L2, the unit is retracted in the direction of the projection optical system 40 than optical members on the optical path L1. Therefore, the distance (H2) in the present embodiment is a distance, as illustrated, between an end edge of the optical members on the optical path L1 and the projection light emitting position.

Therefore, the distance (H2) in the present embodiment is smaller than the distance (h2) in the example of the arrangement (comparative example) in FIG. 3B by a distance Δh in the figure. In this way, in the present embodiment, as well as the distance (H1) in FIG. 2, the distance (H2) can be suppressed as compared to the example of an arrangement shown in FIG. 9, and therefore, the distance (H0) from the wall surface to the projection light emitting position can be markedly suppressed as compared to the example of the arrangement shown in FIG. 9.

In the present embodiment, since the electric circuit system 200 is disposed in an extra space created between the light source 11 and the projection optical system 40, not between the optical engine 10 and the wall surface, waste of space caused within the projector can be suppressed, and at the same time, the distance (H1) between the optical engine 10 and the wall surface can be suppressed.

Furthermore, in the present embodiment, it is designed that the B-light transmits through the dichroic mirror 101 and is entered to the liquid crystal panel 103, and therefore, the optical path of the B-light can be shortened as compared to the G-light and R-light entered to the liquid crystal panels 109 and 115 via the relay lenses 104, 106, 110, and 112. At the same time, the number of the optical members through which the B-light transmits can be reduced as compared to those of the G-light and R-light. Accordingly, an attenuation amount of light of the B-light can be suppressed as compared to those of the G-light and R-light, and as a result, even in a case where an ultraviolet elimination filter or the like is disposed between the light source 11 and a fly-eye integrator 12, sufficient amount of the B-light can be projected on the screen.

FIGS. 4A and 4B illustrate states when the projector according to the present embodiment is used. FIG. 4A illustrates a state in a case where the projector is suspended from a ceiling, and FIG. 4B illustrates a state in a case where the projector is placed on a desk. In the state in FIG. 4A, a screen 400 is integrated with the projector via a holding mechanism 300a, and further, the holding mechanism 300a is mounted to a stand 300b installed on a floor.

In the present embodiment, since the distance (H0) is suppressed as mentioned above, opportunities that people, things or the like block a traveling path of the projection light can be reduced in both of the state shown in FIGS. 4A and 4B. Therefore, in both of the states, higher operability and ease of use can be provided to users.

Figure 5:
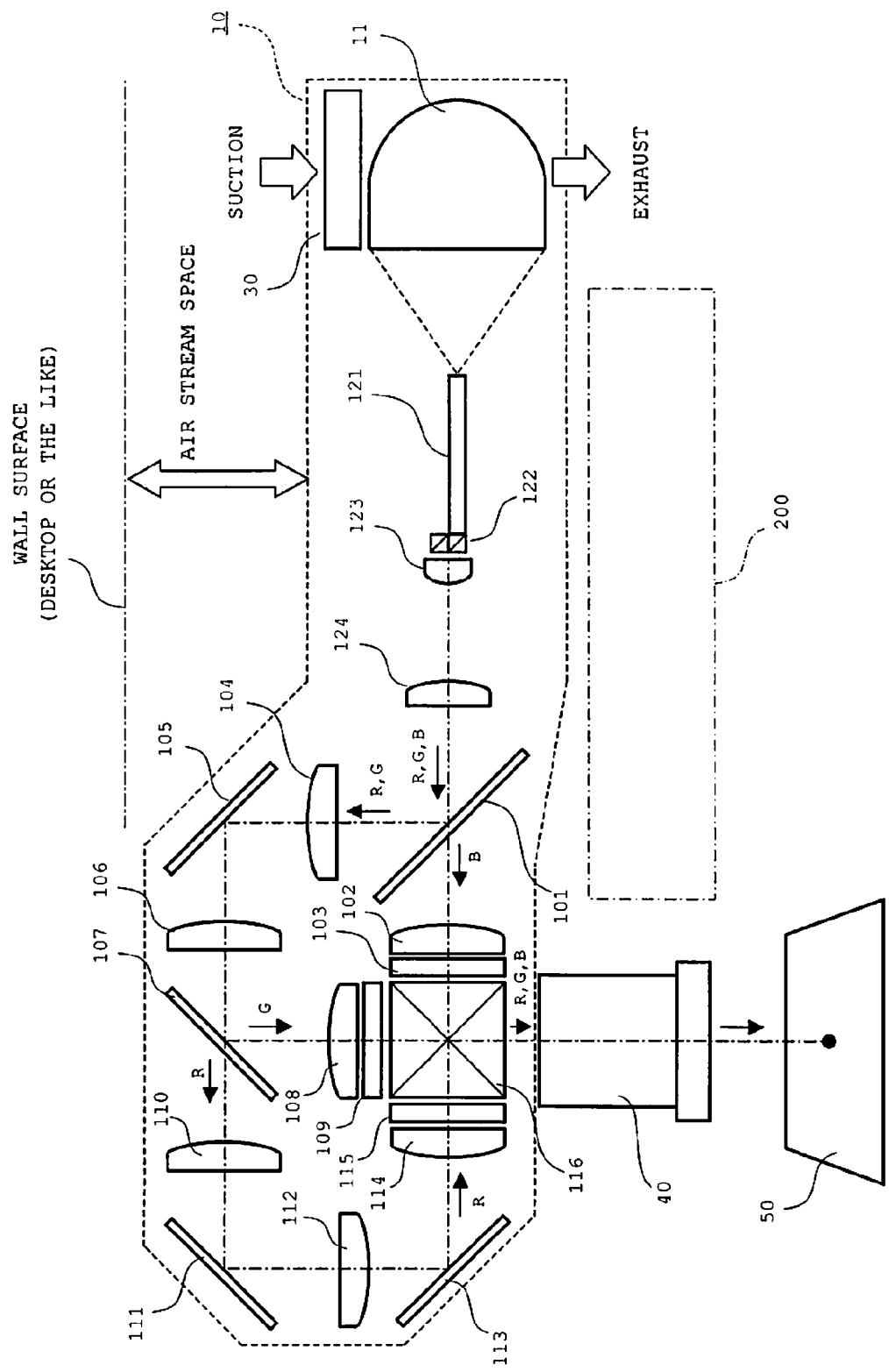
FIG. 5 illustrates an example of an alteration of the projector according to the embodiment.

Although a fly-eye integrator is used in the embodiment as optical means for uniforming light, a rod integrator 121 may also be used as the optical means for uniforming the light as shown in FIG. 5. Although, a rod integrator made of a transparent material is exemplified in FIG. 5, the same effects can be obtained with a hollow rod integrator where a plurality of mirrors are disposed so as to direct the reflecting planes inwardly.

In the example of the arrangement shown in FIG. 5, a reflector of the light source 11 has such a shape that light are focused on approximately one point. At the light focusing position, the integrator (rod integrator) 121 having a rod-like shape and made of the transparent material is disposed. The light entered to the rod integrator 121 obtains uniformity of light quantity distribution on the liquid crystal panels 103, 109 and 115 by repeatedly reflect in the rod integrator 121.

A polarization conversion element 122 having two PBSs is disposed at an emission end of the rod integrator 121. Light emitted from the rod integrator 121 is entered to a first PBS of two PBSs constituting the polarization conversion element 122, and, for example, P-polarization light is emitted from the first PBS to the relay lens 123 side. The light (S-polarization) reflected by the first PBS is entered to the other PBS (a second PBS), reflected by the second PBS and then travels to the relay lens 123. At a light emitting position of the second PBS, a ½ wavelength plate is disposed, and the light emitted from the second PBS becomes P-polarization by the function of the ½ wavelength plate. Therefore, the light entered to the relay lens 123 from both the first PBS and second PBS become P-polarization.

A direction of polarization of light transmitted through the polarization conversion element 122 can become S-polarization by changing an arrangement of the first PBS. Specifically, a ½ wavelength plate is disposed at the light emitting position of the first PBS so that the light transmitting through the first PBS become S-polarization.

In the PBS array 13 in FIG. 1, a plurality of polarization conversion elements 122 are disposed in an array-like shape at positions corresponding to each of the group of lenses of the fly-eye integrator 12.

The relay lenses 123 and 124 adjust a converging state of the light emitted from the polarization conversion elements 122. An arrangement of elements at an after stage of the relay lens 124 is the same as the arrangement of the embodiment shown in FIG. 1. Also, in the example of the arrangement shown in FIG. 5, the same effects as obtained by the above-mentioned embodiment shown in FIG. 1 are obtained.

Figure 6:
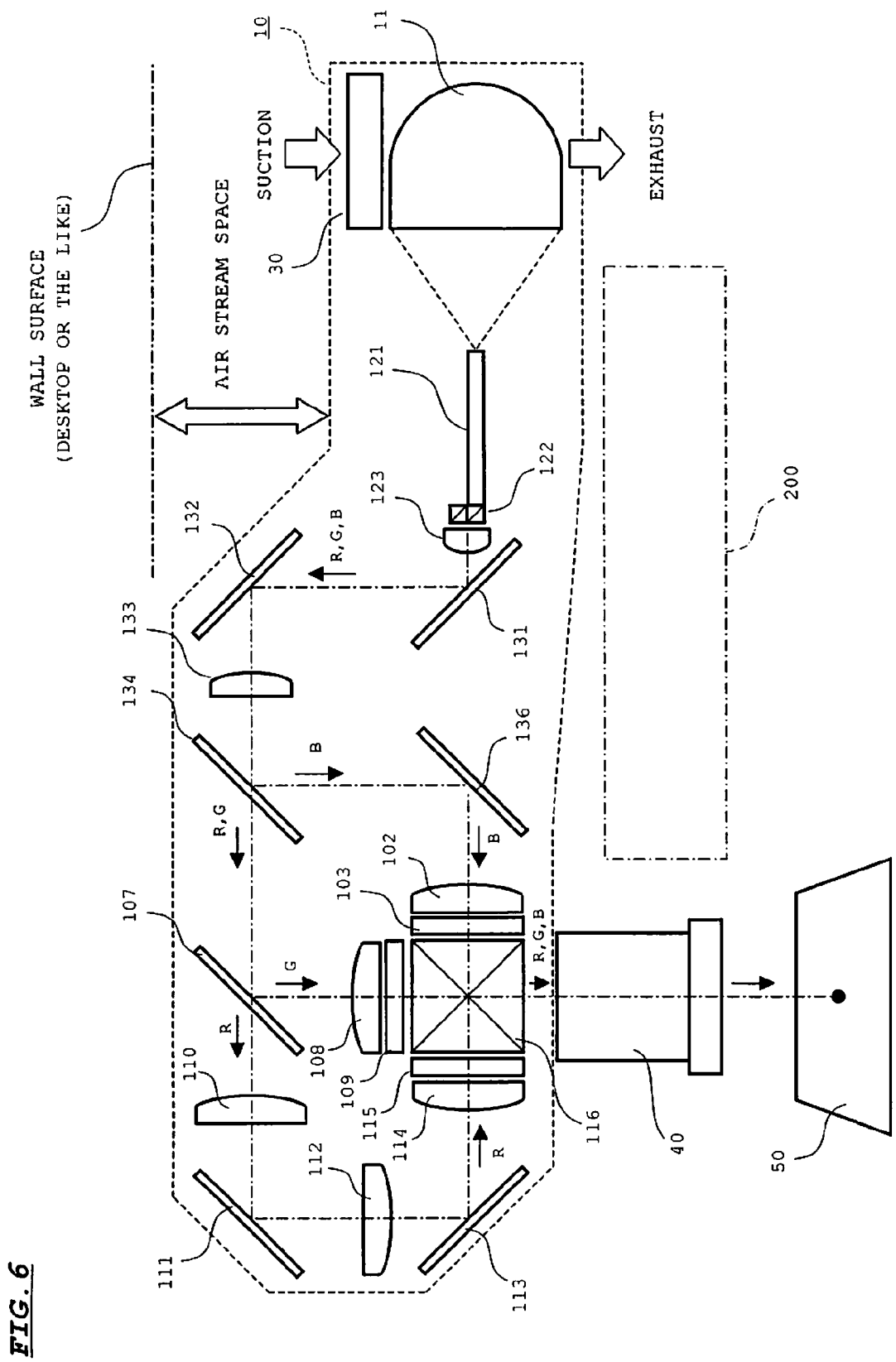
FIG. 6 illustrates other example of an alteration of the projector according to the embodiment.
Figure 7:
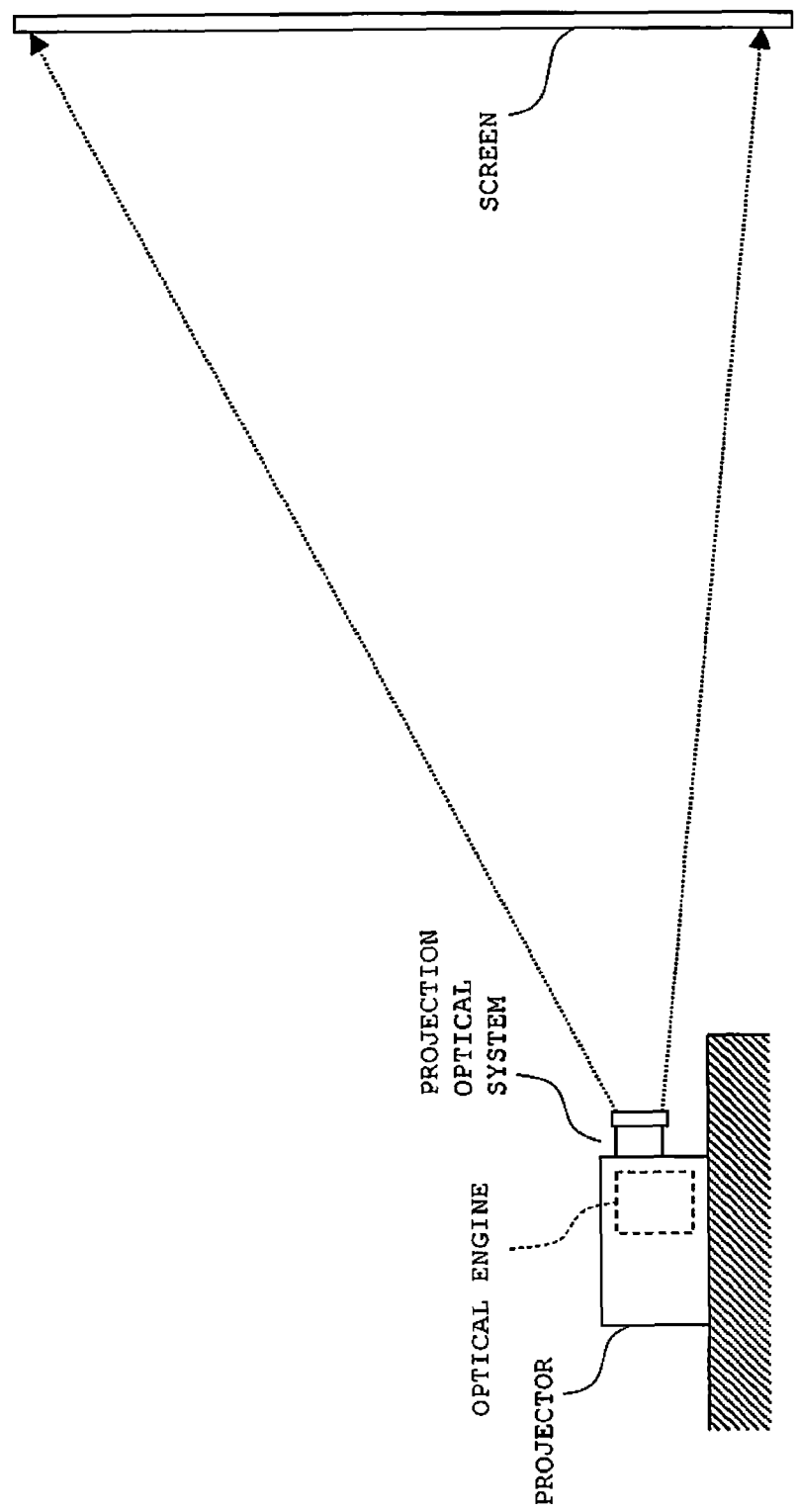
FIG. 7 illustrates an example in the background art.
Figure 8:
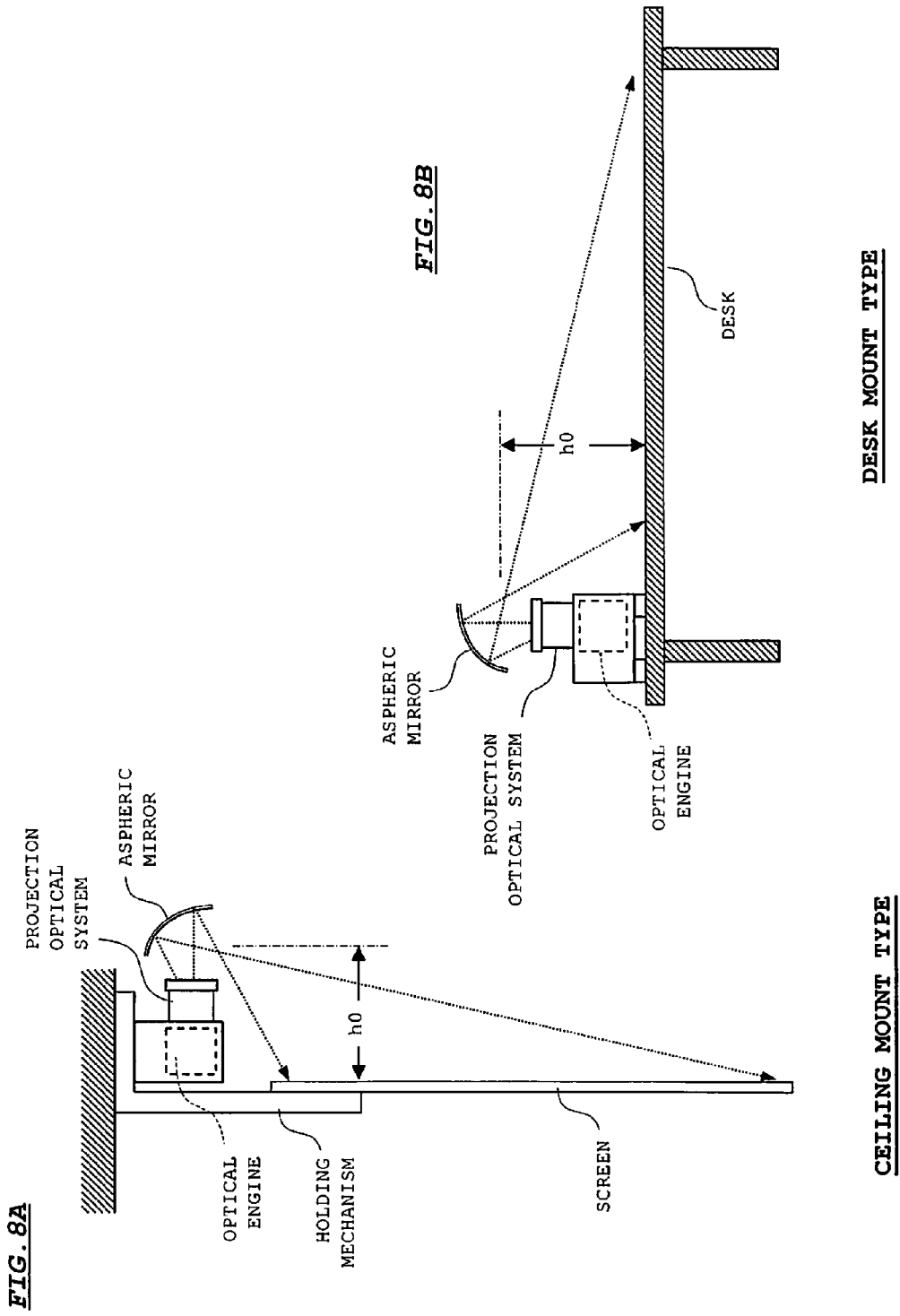
FIGS. 8A and 8B illustrate states when a projector that projects projection light at a wider angle by an aspherical mirror is used.

FIG. 6 shows another alteration of the example of the arrangement shown in FIG. 5. In this example of the arrangement, an optical system from the mirror 131 to the mirror 136 is different as compared to the example of the arrangement shown in FIG. 5.

That is, the light transmitted through the relay lens 123 is entered to the relay lens 133 after the optical path thereof is bent by the mirrors 131 and 132. Of white light transmitted through the relay lens 133, the B-light is reflected by a dichroic mirror 134, while the G-light and R-light transmit through the dichroic mirror 134. The B-light reflected by the dichroic mirror 134 is reflected by a mirror 136 and is guided to a liquid crystal panel 103. The G-light and R-light transmitted through the dichroic mirror 134 then travel the optical path same as the one shown in FIG. 5 and are guided to liquid crystal panels 109 and 115, respectively.

In this example of the arrangement, a length of the optical path from the polarization conversion elements 122 to the liquid crystal panels 103 is the same as a length of the optical path from the polarization conversion elements 122 to the liquid crystal panels 109. Therefore, in this example of the arrangement, the optical paths of the B-light and G-light need not be adjusted by the relay lenses. For this reason, two relay lenses 104 and 106 in FIG. 5 are omitted. However, in this example of the arrangement, a length of the optical path from the polarization conversion element 122 to the liquid crystal panel 103 is longer than that of in the example of the arrangement shown in FIG. 5, and therefore, an attenuation of light quantity of the B-light is slightly greater as compared to the example of the arrangement shown in FIG. 5. In addition, due to the fact that the optical path is bent by two mirrors 131 and 132, the number of the mirrors increases as compared to the example of the arrangement shown in FIG. 5, and a dimension of the optical engine 10 in a direction of the optical axis of the light source 11 become larger.

The embodiments according to the present invention have been described as mentioned above, while the embodiments are not to be construed to limit the present invention in any manner whatsoever. Further, various other changes and modifications can be made with respect to the embodiments of the present invention.

For example, although in the above-mentioned embodiments, the B-light, G-light, and R-light are entered to the liquid crystal panels 103, 109, and 115 and modulated, and the light after modulated are synthesized by the dichroic prism 116, light of other than the light in these wavelength bands may further be modulated by corresponding liquid crystal panels, the light after modulated may be synthesized together with the B-light, G-light, and R-light and the synthesized light may be entered to the projection optical system 40. For example, when light emitted by a lamp in the light source 11 has a spectral component in a yellow wavelength band (hereafter, referred to as "Y-light") in addition to the B-light, G-light, and R-light, the Y-light may be separated by a dichroic mirror, relayed by a relay lens and is guided to a corresponding liquid crystal panel, and the Y-light modulated by the liquid crystal panel may be synthesized by the dichroic prism together with the B-light, G-light, and R-light.

Furthermore, in the above-mentioned embodiment, while the optical system is made so that the length of the optical path of the G-light is shorter than that of the R-light, another optical system may be made so that the length of the optical path of the R-light is shorter than that of G-light.

Moreover, various changes and modifications can be made to the embodiment of the present invention within the technical concept defined in the scope of claims.

What is claimed is:

1. A projection display device comprising:
a light source;
a cooling unit for cooling the light source;
a plurality of imagers individually disposed corresponding to light in at least three wavelength bands;
a light guiding optical system for guiding the light in the respective wavelength bands, among light from the light source, to the corresponding imagers respectively;
a photosynthesis element for synthesizing the light in the respective wavelength bands modulated by the imagers; and
a projection optical system for projecting the light synthesized by the photosynthesis element, wherein
a first axis which is formed by lengthening an optical axis of the light source with respect to the light right after being emitted from the light source and a second axis which is formed by lengthening an optical axis of the projection optical system approximately orthogonally intersect, and at the same time, the light guiding optical system protrudes in an opposite direction from a position of the projection optical system with regard to the first axis.

2. The projection display device according to claim 1, wherein
the light guiding optical system causes light in a first wavelength band, among the light in the respective wavelength bands, to travel along the first axis and to enter the corresponding imager, and at the same time, causes light in the wavelength band other than the first wavelength band to take a detour in a direction vertical to the first axis and to enter the corresponding imager via a relay optical system.

3. The projection display device according to claim 2, wherein
when n of imagers including the imagers corresponding to the light in the three wavelength bands respectively are disposed, the light in the wavelength band other than the first wavelength band is entered to the corresponding imager via at least (n−1) relay optical systems.

4. The projection display device according to claim 2, wherein the light in the first wavelength band is light in a blue wavelength band.

5. The projection display device according to claim 2, wherein a fly-eye integrator for uniforming the light from the light source is provided between the light guiding optical system and the light source, and wherein
the light guiding optical system comprises
a first relay optical system including a first wavelength selective mirror that transmits the light in the first wavelength band, among light entered from the fly-eye integrator side, and reflects light in the wavelength bands other than the first wavelength band, and a second wavelength selective mirror that guides light in a second wavelength band reflected by the first wavelength selective mirror to the corresponding imager and separates the light in the second wavelength band and light in a third wavelength band, and
a second relay optical system that guides the light in the third wavelength band separated by the second wavelength selective mirror to the corresponding imager.

6. The projection display device according to claim 2, wherein
a rod integrator for uniforming the light from the light source is provided between the light guiding optical system and the light source, and wherein
the light guiding optical system comprises
a first relay optical system including a first wavelength selective mirror that transmits the light in the first wavelength, among light entered from the rod integrator side, and reflects light in the wavelength bands other than the first wavelength, and a second wavelength selective mirror that guides light in a second wavelength band reflected by the first wavelength selective mirror to the corresponding imager and separates the light in the second wavelength band and light in a third wavelength band, and
a second relay optical system that guides the light in the third wavelength band separated by the second wavelength selective mirror to the corresponding imager.

7. The projection display device according to claim 1, wherein an electric circuit system is disposed in a space between the light source and the projection optical system.

8. The projection display device according to claim 1, wherein
terminals relating to the electric circuit system are disposed to a side surface among side surfaces of an external housing excluding a side surface positioned at an opposite side of the projection optical system with regard to the first axis.

9. The projection display device according to claim 1, wherein
a screen is integrally mounted to the projection display device via a holding mechanism.

* * * * *